United States Patent
Goringe et al.

(10) Patent No.: US 7,245,584 B2
(45) Date of Patent: Jul. 17, 2007

(54) METHOD AND APPARATUS FOR AUDITING SERVICE LEVEL AGREEMENTS BY TEST PACKET INSERTION

(75) Inventors: Christopher M. Goringe, Seven Hills (AU); Muneyb Minhazuddin, Quakers Hill (AU); James D. Schreuder, Summer Hill (AU)

(73) Assignee: Avaya Technology Corp., Basking Ridge, NJ (US)

( * ) Notice: Subject to any disclaimer, the term of this patent is extended or adjusted under 35 U.S.C. 154(b) by 906 days.

(21) Appl. No.: 10/299,459

(22) Filed: Nov. 18, 2002

(65) Prior Publication Data

US 2004/0095893 A1    May 20, 2004

(51) Int. Cl.
*H04L 12/26* (2006.01)
(52) U.S. Cl. .................................... 370/232
(58) Field of Classification Search ............... 370/232, 370/229, 230, 233, 465, 477, 400, 401, 409; 709/227
See application file for complete search history.

(56) References Cited

U.S. PATENT DOCUMENTS

| | | | |
|---|---|---|---|
| 4,569,042 A | 2/1986 | Larson | 370/13 |
| 5,799,002 A | 8/1998 | Krishnan | 370/234 |
| 6,134,219 A | 10/2000 | Sato | |
| 6,363,053 B1 | 3/2002 | Schuster et al. | 370/230 |
| 6,459,682 B1 * | 10/2002 | Ellesson et al. | 370/235 |
| 6,711,607 B1 * | 3/2004 | Goyal | 709/203 |
| 6,807,156 B1 * | 10/2004 | Veres et al. | 370/252 |
| 6,826,150 B1 * | 11/2004 | Bhattacharya et al. | 370/230 |
| 6,839,327 B1 * | 1/2005 | Zavalkovsky et al. | 370/252 |

FOREIGN PATENT DOCUMENTS

| | | |
|---|---|---|
| EP | 1 107 509 A2 | 6/2001 |
| JP | 2000354046 | 12/2000 |
| JP | 2002-016599 | 1/2002 |
| WO | 02/29673 | 4/2002 |

OTHER PUBLICATIONS

Canadian Office Action for counterpart application No. 2,448,312 dated Dec. 12, 2005.
Examiner's Office Letter from the Japanese Patent Office; Mailing Date of Oct. 2, 2006; Japanese Patent Application No. 2003-387420; 2 pages.

(Continued)

*Primary Examiner*—Dmitry Levitan
(74) *Attorney, Agent, or Firm*—Sheridan Ross P.C.

(57) ABSTRACT

The present invention is directed to the measurement of service levels provided by a communication network, including an Internet protocol communication network. In accordance with the present invention, test packets are sent from a first edge router across the communication network to a second edge router. The time required for the test packets to be transmitted across the communication network is then determined, and that time compared to the time specified by the governing service level agreement. A failure of the communication network to deliver test packets as guaranteed may be used as an indication that the service level agreement has been violated. Packet loss and packet jitter may also be measured and compared to levels guaranteed by the service level agreement. The present invention may be used to determine whether the delivery of data packets using requests for expedited service levels is necessary or desirable.

27 Claims, 4 Drawing Sheets

OTHER PUBLICATIONS

Office Action from Canadian Intellectual Property Office; Dec. 12, 2005; Canadian Patent Application No. 2,448,312; 2 pages.
Office Action for Canadian Patent Application No. 2448312, mailed Mar. 19, 2007.

Further Examination Report for European Patent Application No. 03257251.3 dated Feb. 23, 2007 (4366-102).
Examiner's Refusal Decision for Japanese Patent Application No. 2003-387420, dispatched Apr. 9, 2007 (4366-102-JP).

* cited by examiner

METHOD AND APPARATUS FOR AUDITING SERVICE LEVEL AGREEMENTS BY TEST PACKET INSERTION

FIELD OF THE INVENTION

The present invention is directed to the auditing of service level agreements. In particular, the present invention provides for the auditing of communication network service level agreements by test packet insertion.

BACKGROUND OF THE INVENTION

A service level agreement is a business agreement between a client and a provider of communication or computer network capacity. Traditionally, such agreements have specified a minimum bandwidth to be provided in connection with ATM/frame relay technology. However, such agreements have not typically been used in connection with Internet protocol networks.

With the development of new Internet protocol technologies, such as differentiated services (DiffServ), contracts between clients and network serviced providers are more likely to specify minimum quality of service levels in connection with Internet protocol networks. For example, a service provider may guarantee that traffic marked with the DiffServ Expedited Forwarding code points will take less than 50 milliseconds to transit the network with less than 0.1% of the packets being dropped, provided that less than 10% of the traffic is marked with an expedited flag.

In the event that the perceived quality of network service is less than the guaranteed levels, it will be necessary for the client to audit the actual service levels provided by the network. This must be done in a reliable and unobtrusive way in order to establish that the service provider is not meeting the terms of the agreement, or to identify other potential sources for the perceived quality deficit. In addition, it would be desirable to provide a way to determine whether the actual service levels provided by an Internet protocol network requires that data packets be marked with an expedited flag, potentially incurring additional cost for the transmission of those packets, in order to ensure delivery of such data packets within desired performance parameters.

Prior art solutions for auditing network service levels are only capable of auditing ATM or frame relay networks; they are incapable of auditing Internet protocol networks. Furthermore, prior art auditing solutions measure the quality of service from end to end, rather than within or across the network region governed by a service level agreement. Measuring the end to end performance available between communication end points does not provide an acceptable way to audit the performance of a service provider network, because a measurement of end to end performance typically includes the effects of the customer's network at one or both ends of the communication.

SUMMARY OF THE INVENTION

The present invention is directed to solving these and other problems and disadvantages of the prior art. Generally, according to the present invention, a test packet is inserted into a communication network under test at a first edge router. The time for the test packet to transit from the first edge router across the network under test to a second edge router is then determined. A determination may then be made as to whether the observed transit time is within the parameters set by the applicable service level agreement. In accordance with another embodiment of the present invention, additional or alternative transmission parameters are determined. For example, packet loss rate, and packet jitter may be determined.

In accordance with a further embodiment of the present invention, test packets having different requested quality of service levels are inserted at a first router on the edge of the network under test. The test packets are then transmitted to a second edge router across the network under test, and one or more parameters regarding the transmission of the test packets are determined.

In accordance with still another embodiment of the present invention, prior to sending test packets across the network under test, the queues established on the first router are identified. In addition, the status of each of the identified queues is determined. If the number of data packets within an identified queue exceeds a predetermined amount, the insertion of test packets into the network under test may be delayed or may be made from another queue on the router. In accordance with yet another embodiment of the present invention, recent or existing traffic levels on the communication network are monitored. If the total volume of data packets sent across the network or the volume of data packets marked with a desired quality of service level of at least a first amount exceeds a threshold number, the insertion of test packets is delayed.

In accordance with an embodiment of the present invention, a system for auditing service level agreements includes at least a first edge router. The first edge router may be interconnected to a management server running application software capable of monitoring communication network parameters, and of providing test packets to the first router for insertion into the communication network. In accordance with another embodiment of the present invention, the first edge router is capable of running management software, without requiring a separate management server.

These and other advantages and features of the invention will become more apparent from the following discussion, particularly when taken together with accompanying drawings.

DETAILED DESCRIPTION

The present invention is directed to the auditing of communication network service level agreements.

Figure 1:
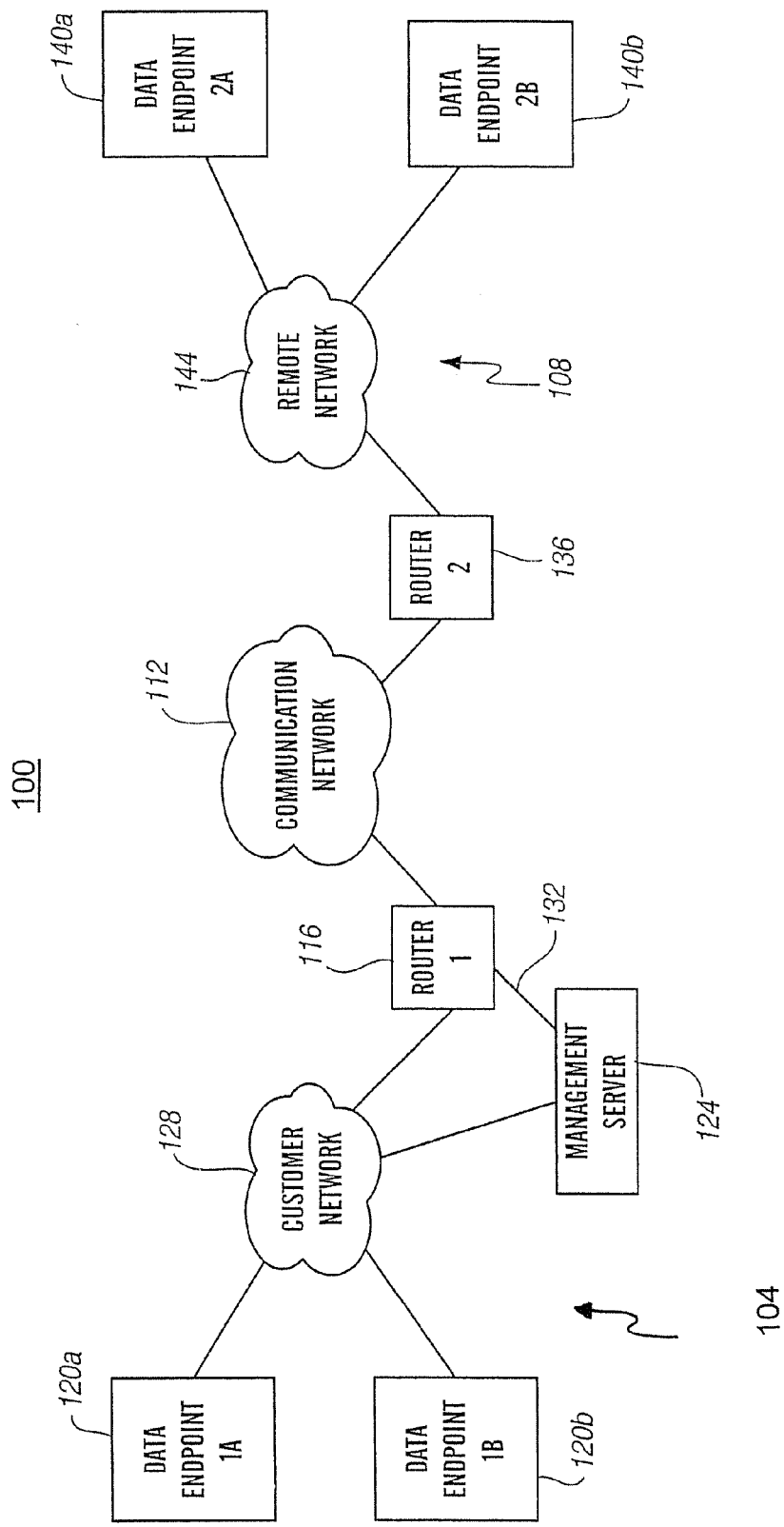
FIG. 1 is a block diagram of a communication system in accordance with an embodiment of the present invention.

FIG. 1 is a block diagram of a communication system 100 in accordance with an embodiment of the present invention.

In general, the communication system 100 includes a first subnetwork 104 and a second or a remote subnetwork 108. The first subnetwork 104 is interconnected to the second subnetwork 108 by a communication network 112.

The first subnetwork 104 generally includes an edge router 116 and one or more data endpoints 120. The data endpoints 120 may comprise any device capable of initiating or receiving communications that can be transmitted according to packet data protocols across a communication network 112. Accordingly, examples of data endpoints 120 include general purpose computers, Internet protocol telephones, and soft telephones running on a general purpose computer. In addition, the first subnetwork 104 may include a management server 124. As shown in FIG. 1, the first subnetwork 104 may comprise a customer communication network 128 for enabling communications between the various components 116-124 of the first subnetwork 104. As can be appreciated by one of skill in the art, examples of a first subnetwork 104 include an intranet or a private branch exchange.

The communication network 112 generally includes a packet data network. For example, the communication network 112 may comprise an Internet protocol network. In general, the communication network 112 may be used by one or more clients or network customers to transmit data, including voice communications, between two or more subnetworks (e.g. subnetworks 104, 108).

Figure 2:
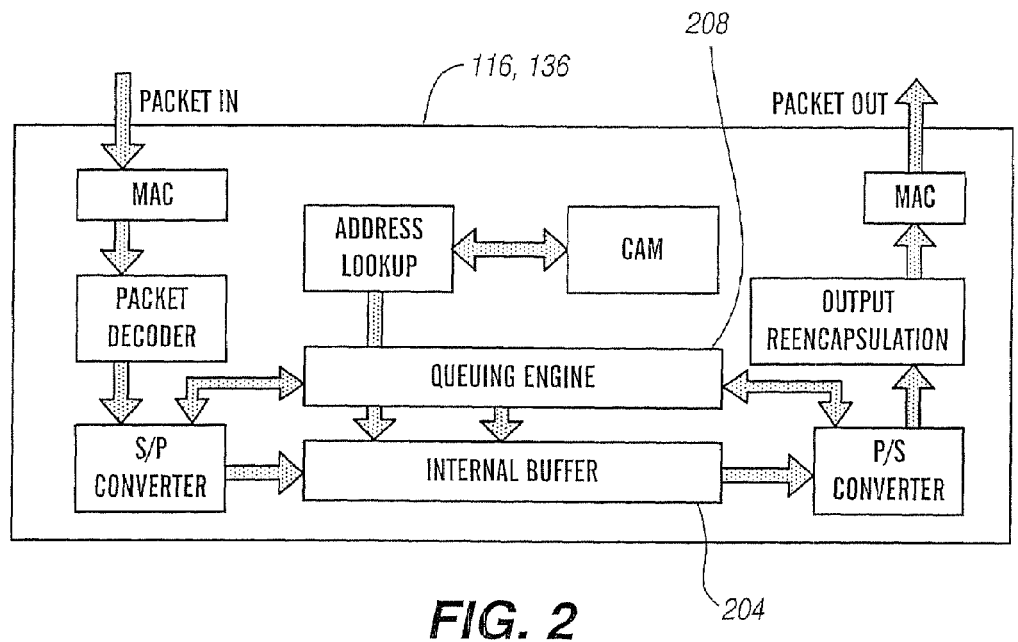
FIG. 2 is a block diagram of an edge router in accordance with an embodiment of the present invention.

With reference now to FIG. 2, a router 116 in accordance with an embodiment of the present invention is illustrated in block diagram form. In general, the router 116 includes an internal buffer 204 comprising memory in which packet queues may be established in accordance with instructions received from a queuing engine 208. As can further be appreciated, queues within the internal buffer 204 may be established separately for incoming and outgoing packets. In addition, one or more queues may be established for each quality of service level recognized by the router 116 that may be associated with individual data packets.

Figure 3:
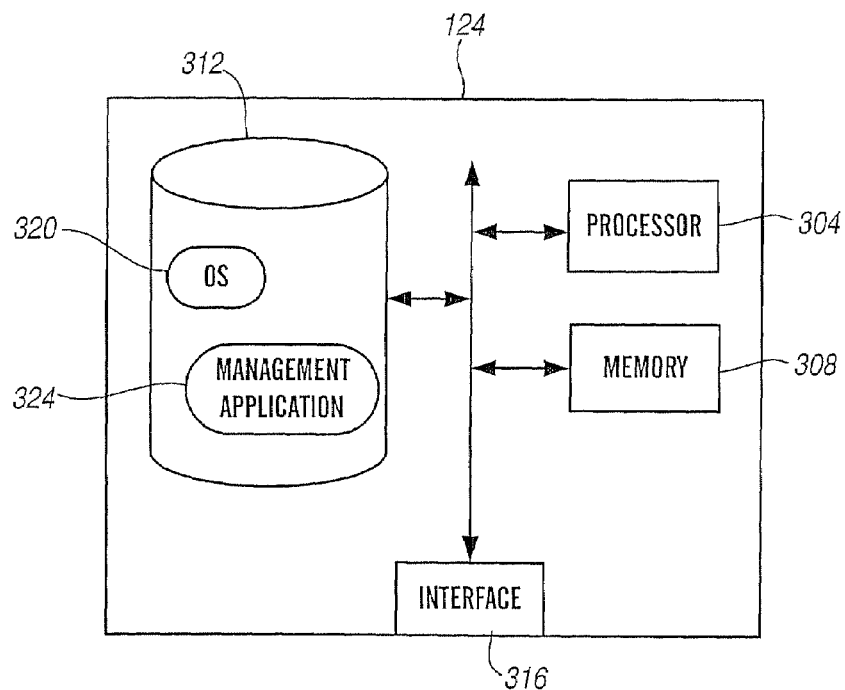
FIG. 3 is a block diagram of a management server in accordance with an embodiment of the present invention.

The management server 124 may be interconnected to the first router 116 through either or both of the customer network 128 or a communication channel 132 (see FIG. 1). With reference now to FIG. 3, the management server 124 may comprise a general purpose computer having a processor 304, memory 308, data storage 312, and a communication network interface 316. The processor 304 may include any general purpose programmable processor capable of running software, such as software stored on the data storage 312. In an alternative embodiment, the management server 124 may include a processor 304 that comprises a controller running microcode. The memory 308 may comprise any memory suitable for the temporary storage of data. The data storage 312 may include mass storage devices, such as hard disk drives, optical drives, or tape drives. The data storage 312 may store an operating system 320 and a management application 324.

With continued reference to FIG. 1, the second subnetwork 108 may include an edge router 136, data endpoints 140, and a remote network infrastructure 144. The second router 136 may comprise an edge router, and may generally be configured like the first router 116 illustrated in FIG. 2. In general, the second router 136 interconnects the second subnetwork 108 to the communication network 112. The data endpoints 140 may comprise any device capable of initiating or receiving communications that can be transmitted according to packet data protocols across a communication network 112. Accordingly, examples of data endpoints 140 include general purpose computers, Internet protocol telephones, and soft telephones running on a general purpose computer.

Figure 4:
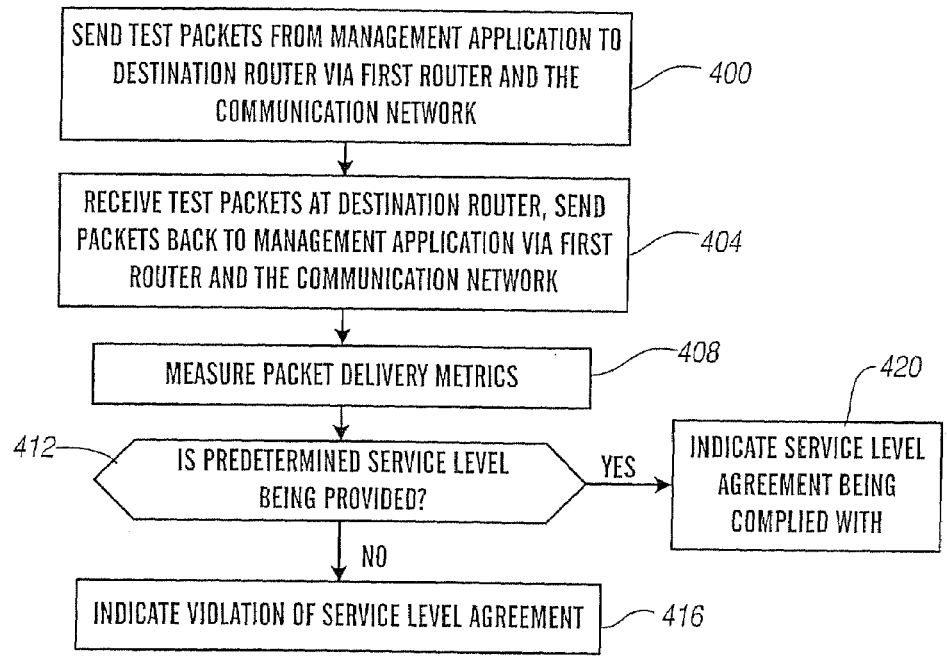
FIG. 4 is a flow chart depicting the operation of a system in accordance with an embodiment of the present invention.

With reference now to FIG. 4, the operation of a system 100 in accordance with an embodiment of the present invention is depicted. Initially, at step 400, test packets are sent from a management application 324 to a destination router 136 via a first router 116 and the communication network 112. The management application 324 may be stored in data storage 312 and run on a processor 304 provided in connection with the management server 124. As can also be appreciated, the router 116 may incorporate the functions of the management server 124. Accordingly, the management application 324 may be running on a processor provided as part of the first router 116. The test packets sent from the first router 116 across the communication network 112 may be marked with a priority or requested quality of service level. Furthermore, different packets among the test packets sent from the first router 116 as part of a test sequence may be marked with different requested quality of service levels. The request for a particular level of service may be made in accordance with a differentiated services Internet protocol.

At step 404, the test packets are received at the destination or second router 136. The second router 136 then sends those packets back to the management application 324 via the communication network 112 and the first router 116. One or more packet data metrics may then be measured (step 408). For example, the time required for the test packets to transit from the first router 116 across the communication network 112, to the second router 136, may be determined by dividing the round trip time required for the packets to travel from the first router 116 to the second router 136 and back to the first router 116 by two. In accordance with an embodiment in which the test packets are sent from a management server 124 that is interconnected to the first router 116 through either the first customer network infrastructure 128 or a specially provided communication channel 132, the time spent by the test packets transiting between the management server 124 and the first router 116 is subtracted from the total round trip time observed in connection with the packets. When half the round trip time is not believed to accurately reflect the time required for data packets to be delivered by the communication network 112, for example where the initial delivery and return transit times are asymmetric, a trusted second router 136 may be used to time stamp the test packets as they arrive at the second router 136. A trusted second router 136 may include a second edge router operated by the operator of the first subnetwork 104 and located remotely from the first subnetwork 104, or operated by a trusted third party.

At step 412, a determination is made as to whether a predetermined service level is being provided by the communication network. For example, the measured packet data metric or metrics may be compared to one or more performance parameters specified in a service level agreement governing use of the communication network. If the predetermined service level is not met, a signal indicating that the service level agreement has been violated may be generated (step 416). If the comparison indicates that the predetermined service level is being met, a signal indicating that the service level agreement is being complied with may be generated (step 420).

As can be appreciated by one of skill in the art, the test packets may be time stamped at various points along their delivery path in order to determine transmission times. In accordance with an embodiment of the present invention, Internet control message protocol echo packets are used to determine the round-trip times for the test packets within a test sequence. As can also be appreciated, other parameters of a communication network's 112 performance can be obtained, for example by observing the arrival times and the arrival order of test packets at the first router 116, the second router 136, or the management server 124 after transmission of the test packets across the communication network 112. Examples of additional or alternative packet parameters that may be measured in connection with the performance of a communication network 112 include packet loss rate and jitter. In accordance with another embodiment of the present invention, test packets may comprise Internet control message protocol (ICMP) echo packets that have been modified to include differential service level markings, such as a quality of service flag.

Figure 5:
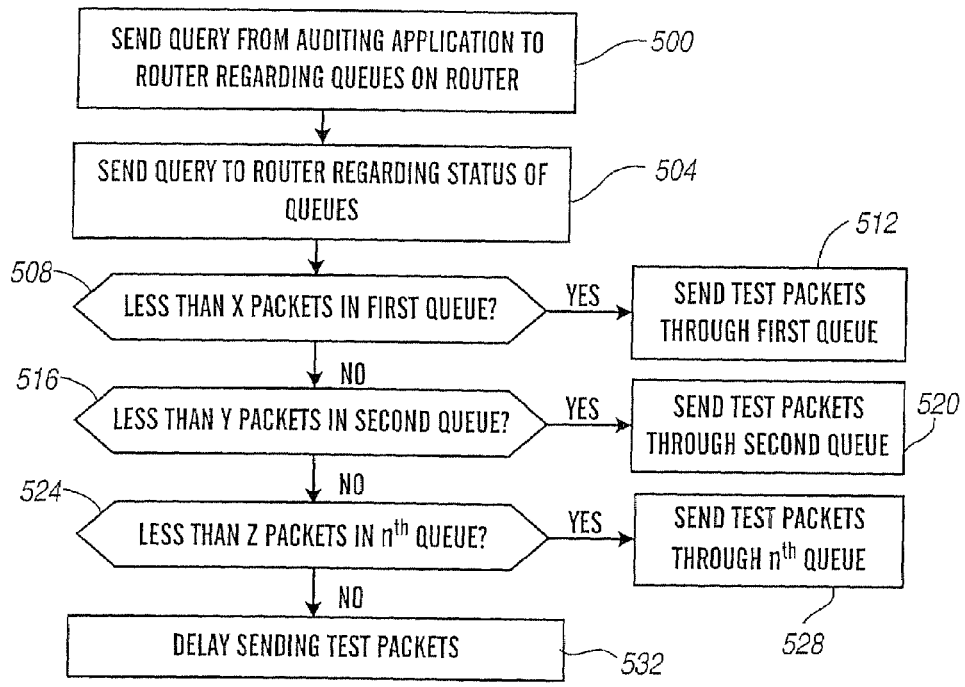
FIG. 5 is block diagram depicting additional aspects of the operation of a system in accordance with an embodiment of the present invention.

With reference now to FIG. 5, additional aspects of a system 100 in accordance with an embodiment of the present invention are depicted. Initially, at step 500, a query is sent from the auditing application 324 to the first router 116 regarding the queues established on the first router 116. After receiving a reply from the first router 116 regarding the existing queues, the auditing or management application 324 queries the router 116 regarding the status of those queues (step 504). At step 508, a determination is made as to whether less than a predetermined number of packets (x) are waiting in the first queue. If this condition is satisfied, test packets are then sent through the first queue (step 512). If the condition with respect to the first queue is not met, a determination is made as to whether there are less than a predetermined number of packets (y) in the second queue (step 516). If there are less than the predetermined number of packets in the second queue, test packets may be sent through the second queue (step 520). If the condition of step 516 is not met with respect to the second queue, additional checks may be made with respect to any remaining queues. For example, at step 524, a determination is made as to whether less than a predetermined number of packets are waiting in an $n^{th}$ queue established in the second router 116. If this condition is met, test packets may be sent through the $n^{th}$ queue (step 528). If there are not less than the predetermined number of packets (z) in the $n^{th}$ queue (i.e., none of the queues established in connection with the first router have less than a predetermined number of packets in them) the sending of test packets is delayed (step 532). Although the example set further above in connection with FIG. 5 describes a different predetermined number (i.e., x, y or z) with respect to each of the queues, it should be appreciated that the predetermined number for some or all of the queues may be the same.

The querying of the first router 116 to determine what queues exist in the router 116, and the conditions of those queues, allows a more accurate measure of communication network 112 parameters to be taken. In particular, as the queues on the router 116 are filled, the time required for data packets to be provided by the router 116 for delivery across the communication network 112 increases. In accordance with an embodiment of the present invention, the predetermined threshold or thresholds used to determine whether test packets may be sent through a particular queue on a router 116 is established by the service level agreement governing use of the communication network 112. As can also be appreciated, queues established in connection with the second router 136 to which test packets are to be addressed can also be identified, and the status of those queues determined. This can ensure that measurements taken with respect to test packets are not negatively impacted by conditions on the second router 136.

Figure 6:
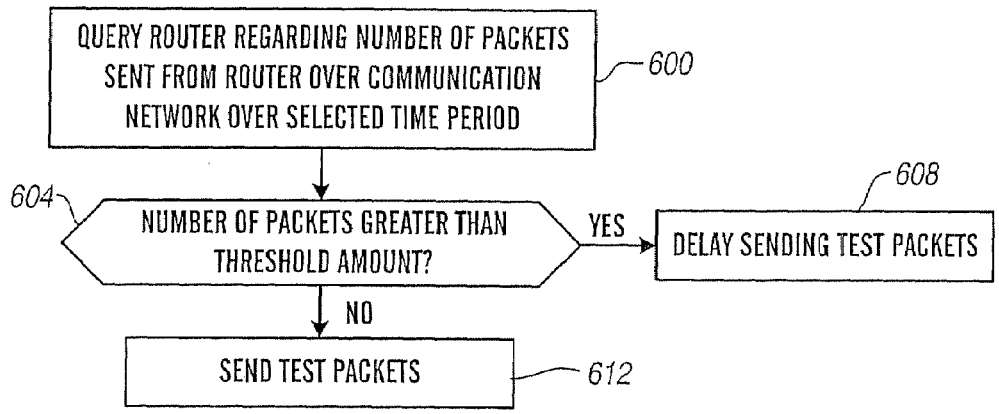
FIG. 6 is a flow chart depicting additional aspects of the operation of a system in accordance with an embodiment of the present invention.

With reference now to FIG. 6, additional aspects of the operation of a system 100 in accordance with an embodiment of the present invention are illustrated. Initially, at step 600, the first router 116 is queried regarding the number of data packets that have been sent from the first router 116 over the communication network 112 within a selected time period. At step 604, a determination is made as to whether the number of packets sent within the selected time period is greater than a threshold amount. If the threshold amount has been exceeded, the sending of test packets is delayed (step 608). If the threshold number of packets has not been exceeded, then the sending of test packets may proceed (step 612).

As can be appreciated, a check to ensure that the number of packets or quantity of data sent across a communication network 112 under test by a router 116 immediately before the insertion of test packets increases the accuracy with which the performance of the communication network 112 can be measured. In particular, by ensuring that the components of the system 100, such as the router 116, 136 in the communication network 112 are not overwhelmed, and more particularly by ensuring that any parameters regarding traffic levels specified in the service level agreement are met, compliance with the terms of the service level agreement can be more accurately determined.

From the description set forth above, it should be appreciated that the insertion of test packets into a communication network 112 can allow parameters regarding the performance of the communication network 112 to be determined. Furthermore, it should be appreciated that the use of a number of test packets allows the performance of a communication network 112 to be determined with greater confidence than if a single test packet, or relatively small number of test packets are sent. However, it should also be appreciated that the number of test packets in total or that are marked with a particular quality of service level should be limited so that any terms regarding use of the communication network 112, and in particular regarding performance guaranteed by a service level agreement at different levels of use, are complied with.

It should also be appreciated that the present invention may be used in connection with determinations regarding the marking of data packets with quality of service level requests. For example, where a client must pay a premium to the operator of the communication network 112 in connection with packets that are marked with an expedited quality of service level, the use of test packets to determine actual service levels being delivered by the communication network 112 may be used to determine whether a lower quality of service level marking will be sufficient. For instance, in connection with a stream of data that requires delivery of associated data packets with a delay across the communication network 112 of 50 milliseconds or less, it may be necessary to mark the packets belonging to the data stream with an expedited level of service request when traffic on the communication network 112 is relatively heavy. However, at times when traffic on the communication network 112 is relatively light, data packets may be delivered within the required 50 millisecond period without requiring the use of an expedited quality of service level.

Figure 7:
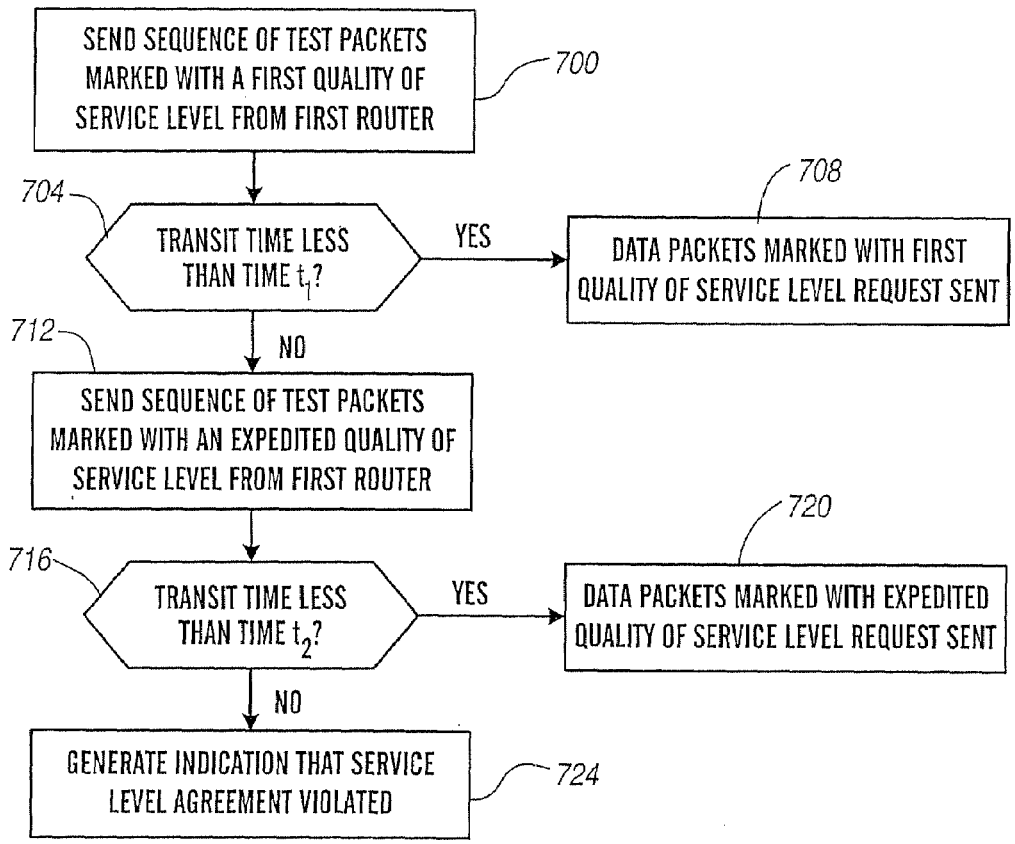
FIG. 7 is a flow chart depicting still other aspects of the operation of a system in accordance with an embodiment of the present invention.

With reference now to FIG. 7, the operation of a system 100 in connection with the determination of actual service levels and the marking of packets with requests for expedited service is illustrated. Initially, at step 700, a sequence of test packets marked with a first or minimal requested quality of service level (for example, a "best effort" service level) are sent across the communication network 112 from the first router 116 to the second router 136. At step 704, a determination is made as to whether the transit time for the test packets marked with a first quality of service level is less than a predetermined amount ($t_1$). The transit time may be determined using any of the methods described above. If the transit time is found to be less than the predetermined amount, data packets may be sent across the communication network 112 marked with the first quality of service level request (step 708).

If the transit time for the test packets marked with the first quality of service level is not less than the first predetermined time, a sequence of test packets marked with an expedited quality of service level are sent from the first router 116 across the communication network 112 (step 712). At step 716, a determination is made as to whether the transit time for the test packets belonging to the second sequence is less than a predetermined amount ($t_2$). The threshold time period $t_2$ to which the second sequence of test packets is compared may be the same as the threshold time $t_1$ used in connection with the first sequence of test packets. In accordance with another embodiment of the present invention, the threshold period of time $t_2$ used in connection with the test packets marked with an expedited quality of service level may be different, for example a shorter period of time or a time period specified as a guaranteed delivery time by a service level agreement may be used. If the transmit time is less than the threshold period of time, data packets marked with the expedited quality of service level request may be sent across the communication network 112 (step 720). If the transit time for the test packets marked with the expedited quality of service level is not less than the threshold period of time $t_2$, an indication that the service level agreement has been violated may be generated (step 724).

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or other embodiments with various modifications required by their particular application or use of the invention. It is intended that the appended claims be construed to include the alternative embodiments to the extent permitted by the prior art.

What is claimed is:

1. A method for auditing communication network service levels, comprising:
   determining a status of a first router;
   in response to determining that the status of said first router is acceptable, sending at least a first packet from said first router to a second router;
   receiving from said second router said at least a first packet at said first router;
   measuring at least a first parameter with respect to said received at least a first packet;
   comparing said measured at least a first parameter to at least a first predetermined value; and
   in response to a first predetermined comparison result between said measured at least a first parameter and said at least a first predetermined value, generating a signal indicating that a first service level is not being met;
   determining a status of a first queue of said first router; and
   in response to determining that at least a first number of packets are waiting in said first queue, providing said at least a first packet to a second queue.

2. The method of claim 1, further comprising:
   marking said at least a first packet with a first requested quality of service level; and
   marking at least a second packet with a second requested quality of service level, wherein said step of comparing comprises comparing said first packet to said at least a first parameter and comparing said second packet to at least a second parameter.

3. The method of claim 1, further comprising:
   generating said at least a first packet in a management server.

4. The method of claim 1, wherein said at least a first parameter comprises a transmission time.

5. The method of claim 4, wherein said transmission time is a round-trip transmission time.

6. The method of claim 4, wherein said transmission time is a one-way transmission time.

7. The method of claim 1, wherein said at least a first parameter comprises packet loss rate.

8. The method of claim 1, wherein said at least a first parameter comprises jitter.

9. The method of claim 1, wherein said at least a first packet comprises a timed packet.

10. The method of claim 9, wherein said timed packet comprises an Internet control message protocol ECHO packet.

11. The method of claim 1, wherein said at least a first packet is marked with a requested quality of service priority level.

12. The method of claim 11, wherein said requested quality of service level comprises a differentiated services quality of service request.

13. The method of claim 1, further comprising:
   determining a status of a first queue on said first router; and
   in response to determining a first status of said first queue, providing said at least a first packet to said first router, wherein said packet is placed in said first queue prior to said step of sending said at least a first packet.

14. A method for auditing communication network service levels, comprising:
   determining a status of a first router;
   in response to determining that the status of said first router is acceptable, sending at least a first packet from said first router to a second router;
   receiving from said second router said at least a first packet at said first router;
   measuring at least a first parameter with respect to said received at least a first packet;
   comparing said measured at least a first parameter to at least a first predetermined value; and
   in response to a first predetermined comparison result between said measured at least a first parameter and said at least a first predetermined value, generating a signal indicating that a first service level is not being met;
   determining a number of packets requesting an expedited service level sent from said router within a first period of time;

comparing said determined number of packets to a threshold amount; and in response to said number of packets being less than said threshold amount, performing said step of sending at least a first packet.

15. A method for managing use of a communication network, comprising:

determining that at least a first number of packets are waiting in a first queue of a first router;

in response to determining that at least a first number of packets are waiting in said first queue, providing at least a first test packet marked with a first requested quality of service level to a second queue of said first router;

transmitting said at least a first test packet marked with a first requested quality of service level across a first communication network from said second queue of said first router;

determining at least a first packet data transmission parameter for said at least a first test packet transmitted across said first communication network;

in response to said at least a first packet data transmission parameter meeting at least a first threshold, transmitting at least a first data packet from a first data endpoint to a second data endpoint across said first communication network, wherein said at least a first data packet is marked with said first requested quality of service level;

in response to said at least a first packet data transmission parameter not meeting said at least a first threshold, transmitting a least a second test packet marked with a second requested quality of service level across said first communication network, wherein said second requested quality of service level provides a higher minimum service level than a minimum service level provided by said first quality of service level.

16. The method of claim 15, further comprising:

determining said at least a first data transmission parameter for said second test packet transmitted across said first communication network; and in response to said at least a first data transmission parameter for said second test packet meeting said at least a first threshold, transmitting at least a first data packet from said first data endpoint to said second data endpoint across said first communication network, wherein said at least a first data packet is marked with said second quality of service level.

17. The method of claim 16, wherein said first quality of service level is less than said second quality of service level.

18. The method of claim 15, wherein said first data endpoint is located on a second network interconnected to said first communication network by at least a first edge router, and wherein said at least a first test packet is sent from said first edge router.

19. The method of claim 18, wherein said second data endpoint is located on a third network interconnected to said first communication network by at least a second edge router, wherein said at least a first test packet is sent from said first edge router to said second edge router.

20. The method of claim 15, wherein a service level agreement for said first communication network establishes said at least a first data transmission parameter.

21. A system for auditing communication network service levels, comprising:

means for determining a status of a first router, wherein said means for determining controls whether a test data packet is transmitted across said communication network, and wherein said means for determining only selects a queue of said first router for transmitting said test data packet that contains less than a predetermined number of packets;

means for interconnecting a first subnetwork to a communication network, wherein said means for interconnecting are capable of transmitting said test data packet across said communication network and receiving said test data packet; and means for detecting at least a first network performance parameter for said communication network with respect to transmission of said test packet.

22. The system of claim 21, wherein said at least a first network performance parameter is set forth in a service level agreement.

23. The system of claim 21, further comprising:

means for outputting said at least a first network performance parameter.

24. A system for auditing communication network service level agreements, comprising:

a first router, comprising:

data storage operable to store at least one of programming and data packets;

a number of queues; and at least a first network interface operable to send and receive data packets between a first subnetwork and a communication network for which guaranteed service levels are set forth in a service level agreement, wherein said first router sends test packets across said communication network only from a queue that is determined to have less than a first number of packets waiting in said queue when said test packets are provided to said first router;

wherein said test packets comprise a first set of test packets with a first quality of service level and a second set of test packets with a second quality of service level, wherein said second quality of service level provides a higher minimum quality of service level than said first quality of service level.

25. The system of claim 24, further comprising:

a first server, comprising:

data storage operable to store programming;

a processor operable to run said programming; and a communication interface interconnecting said first server to said first router over at least one of said first subnetwork and a first communication channel, wherein said programming is operable to instruct said first router to send said test packets and to determine at least a first network performance parameter with respect to said test packets.

26. The system of claim 24, further comprising:

a first data endpoint interconnected to said first subnetwork, wherein said test packets are marked with a first quality of service level, and wherein data packets marked with said first quality of service level are provided by said first data endpoint to said first router for transmission across said communication network in response to a determination that a performance of said communication network meets a first network performance parameter.

27. The system of claim 24, further comprising:

a second subnetwork; and a second router interconnecting said communication network to said second subnetwork, wherein said test packets are transmitted between said first and second routers across said communication network.

* * * * *